US012169535B2

(12) United States Patent
Ravindranath et al.

(10) Patent No.: US 12,169,535 B2
(45) Date of Patent: Dec. 17, 2024

(54) SYSTEM AND METHOD FOR REGION PERSONA GENERATION

(71) Applicant: Verizon Patent and Licensing Inc., Basking Ridge, NJ (US)

(72) Inventors: Vaishali Ravindranath, Tamilnadu (IN); Kushal Singla, Karnataka (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 103 days.

(21) Appl. No.: 17/706,422

(22) Filed: Mar. 28, 2022

(65) Prior Publication Data

US 2023/0306086 A1 Sep. 28, 2023

(51) Int. Cl.
| | |
|---|---|
| *G06F 16/35* | (2019.01) |
| *G06F 16/335* | (2019.01) |
| *G06F 18/23213* | (2023.01) |
| *G06F 18/2413* | (2023.01) |

(52) U.S. Cl.
CPC ...... *G06F 18/23213* (2023.01); *G06F 16/337* (2019.01); *G06F 16/353* (2019.01); *G06F 18/24147* (2023.01)

(58) Field of Classification Search
CPC ............. G06F 16/353; G06F 16/337; G06F 18/23213; G06F 18/24147
See application file for complete search history.

(56) References Cited

U.S. PATENT DOCUMENTS

| | | | |
|---|---|---|---|
| 9,519,936 B2* | 12/2016 | Vijayaraghavan | ........................... G06Q 10/0637 |
| 9,904,690 B1* | 2/2018 | Ferries | ............. G06F 16/24578 |
| 2009/0280799 A1* | 11/2009 | Hattori | .................... G06F 16/29 455/424 |
| 2011/0046991 A1* | 2/2011 | Tobin | .................... G06Q 30/02 705/7.34 |
| 2012/0330676 A1* | 12/2012 | Puckrein | ................ G16H 50/80 705/2 |
| 2014/0229277 A1* | 8/2014 | Khambete | ............ G06F 16/335 705/14.52 |
| 2016/0342911 A1* | 11/2016 | Kannan | ............. G06Q 10/0631 |
| 2018/0060902 A1* | 3/2018 | Allouche | ........... G06Q 10/0639 |
| 2019/0372857 A1* | 12/2019 | Gandhi | ............... H04L 41/0896 |
| 2020/0089786 A1* | 3/2020 | Cheng | ................ G06Q 30/0205 |
| 2022/0156295 A1* | 5/2022 | Hirokawa | ............. G06Q 50/10 |
| 2023/0037997 A1* | 2/2023 | Vagelos | ................ H04W 48/16 |
| 2023/0362674 A1* | 11/2023 | Tandekar | ............. H04W 24/02 |

* cited by examiner

*Primary Examiner* — Hosain T Alam
*Assistant Examiner* — Robert F May

(57) ABSTRACT

One or more computing devices, systems, and/or methods are provided. In an example, a method comprises receiving, by a device, attribute data for a region served by a telecommunications service. A cluster label is determined by the device for the region based on the attribute data. A first region persona is determined by the device for the region using a decision tree classifier model based on the cluster label and the attribute data. Recommended service parameters are implemented for the telecommunications service in the region based on the first region persona.

20 Claims, 9 Drawing Sheets

SYSTEM AND METHOD FOR REGION PERSONA GENERATION

BACKGROUND

Service providers interact with existing and potential customers to provide different services and products in various regions. In a customer-centric business, providing personalized experience to the customers is useful in offering new opportunities, improving customer satisfaction, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
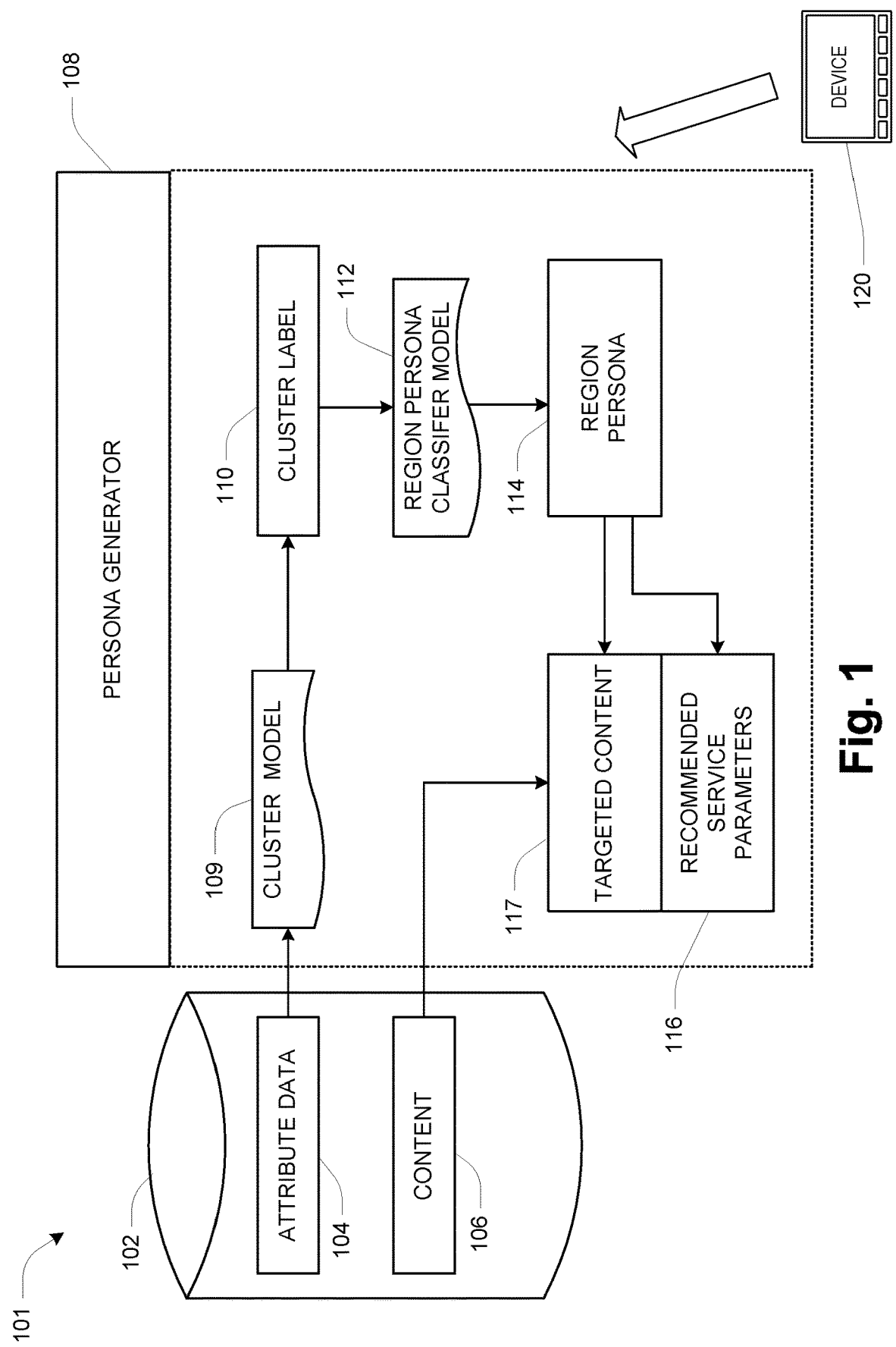
FIG. 1 is a diagram illustrating an example system for region persona generation.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for region persona generation are provided. To identify the needs of the customer and provide recommended service parameters, such as bandwidth, priority, network type (e.g., 5G Nationwide or 5G Ultra-wideband), coverage plan or some other service parameters, regions are grouped into clusters. Individuals in a clustered region may be provided with region specific service parameters and may be targeted with specific content identified as being relevant to that cluster. Region persona generation using descriptive labelling aids in identifying the effective segment for service parameter and content targeting. In some embodiments, cluster labels are generated using K-means clustering. A decision tree classifier model is trained on cluster labels. A region persona may be identified for a particular region by parsing the decision tree classifier, and service parameters or content for the customer is targeted based on the identified region persona. Embodiments described herein include a method comprising receiving, by a device, attribute data for a region served by a telecommunications service, determining, by the device, a cluster label for the region based on the attribute data, determining, by the device, a first region persona for the region using a decision tree classifier model based on the cluster label and the attribute data, and implementing, by the device, recommended service parameters for the telecommunications service in the region based on the first region persona.

In a further aspect of the method, the first region persona comprises a first range of values for a first attribute of the attribute data and a second range of values for a second attribute of the attribute data.

In a further aspect of the method, determining, by the device, the cluster label comprises determining the cluster label using a cluster model.

In a further aspect of the method, determining, by the device, the cluster label using the cluster model comprises determining the cluster label using a k-means cluster model.

Further aspects of the method comprise providing, by the device, targeted content for users in the region based on the first region persona.

In a further aspect of the method, determining, by the device, the first region persona comprises identifying, by the device, a first candidate region persona and a second candidate region persona, determining, by the device, a first score for the first candidate region persona and a second score for the second candidate region persona, and selecting, by the device, the first candidate region persona as the first region persona responsive to the first score being greater than the second score.

In a further aspect of the method, determining, by the device, the first score comprises determining the first score based on a diversity parameter associated with the first candidate region persona.

In a further aspect of the method, determining, by the device, the first score comprises determining the first score based on a size parameter associated with the first candidate region persona.

Further aspects of the method comprise selecting, by the device, a second region persona from the first candidate region persona and the second candidate region persona, providing, by the device, targeted content for users in the region based on first region persona and the second region persona, and sorting, by the device, the targeted content based on the first score and the second score such that a portion of the targeted content associated with the first region persona is provided prior to a second portion of the targeted content associated with the second persona responsive to the first score being greater than the second score.

Embodiments described herein include a system comprising means for receiving, by a device, attribute data for a region served by a telecommunications service, means for determining, by the device, a cluster label for the region based on the attribute data, means for determining, by the device, a first region persona for the region using a decision tree classifier model based on the cluster label and the attribute data, and means for implementing, by the device, recommended service parameters for the telecommunications service in the region based on the first region persona.

Embodiments described herein also include a system comprising a processor configured to execute instructions to facilitate performance of operations comprising receiving attribute data for a region served by a telecommunications service, determining a cluster label for the region based on the attribute data, determining a first region persona for the region using a decision tree classifier model based on the cluster label and the attribute data, and implementing recommended service parameters for the telecommunications service in the region based on the first region persona.

In a further aspect of the system, the first region persona comprises a first range of values for a first attribute of the attribute data and a second range of values for a second attribute of the attribute data.

In a further aspect of the system, the operations comprise determining the cluster label using a cluster model.

In a further aspect of the system, the operations comprise determining the cluster label using a k-means cluster model.

In a further aspect of the system, the operations comprise providing targeted content for users in the region based on the first region persona.

In a further aspect of the system, the operations comprise determining the first region persona by identifying a first candidate region persona and a second candidate region persona, determining a first score for the first candidate region persona and a second score for the second candidate region persona, and selecting the first candidate region persona as the first region persona responsive to the first score being greater than the second score.

In a further aspect of the system, the operations comprise determining the first score based on a diversity parameter associated with the first candidate region persona.

In a further aspect of the system, the operations comprise determining the first score based on a size parameter associated with the first candidate region persona.

In a further aspect of the system, the operations comprise selecting a second region persona from the first candidate region persona and the second candidate region persona, providing, by the device, targeted content for users in the region based on first region persona and the second region persona, and sorting the targeted content based on the score of the first region persona and the score of the second region persona such that a portion of the targeted content associated with the first region persona is provided prior to a second portion of the targeted content associated with the second persona responsive to the first score being greater than the second score.

Embodiments described herein also include a non-transitory computer-readable medium storing instructions thereon that when executed facilitate performance of operations comprising receiving attribute data for a region served by a telecommunications service, determining a cluster label for the region based on the attribute data, determining a first region persona for the region using a decision tree classifier model based on the cluster label and the attribute data, and implementing recommended service parameters for the telecommunications service in the region based on first region persona.

In a further aspect of the non-transitory computer-readable medium, the operations comprise determining the first region persona by identifying a first candidate region persona and a second candidate region persona, determining a first score for the first candidate region persona and a second score for the second candidate region persona, and selecting the first candidate region persona as the first region persona responsive to the first score being greater than the second score.

Figure 2:
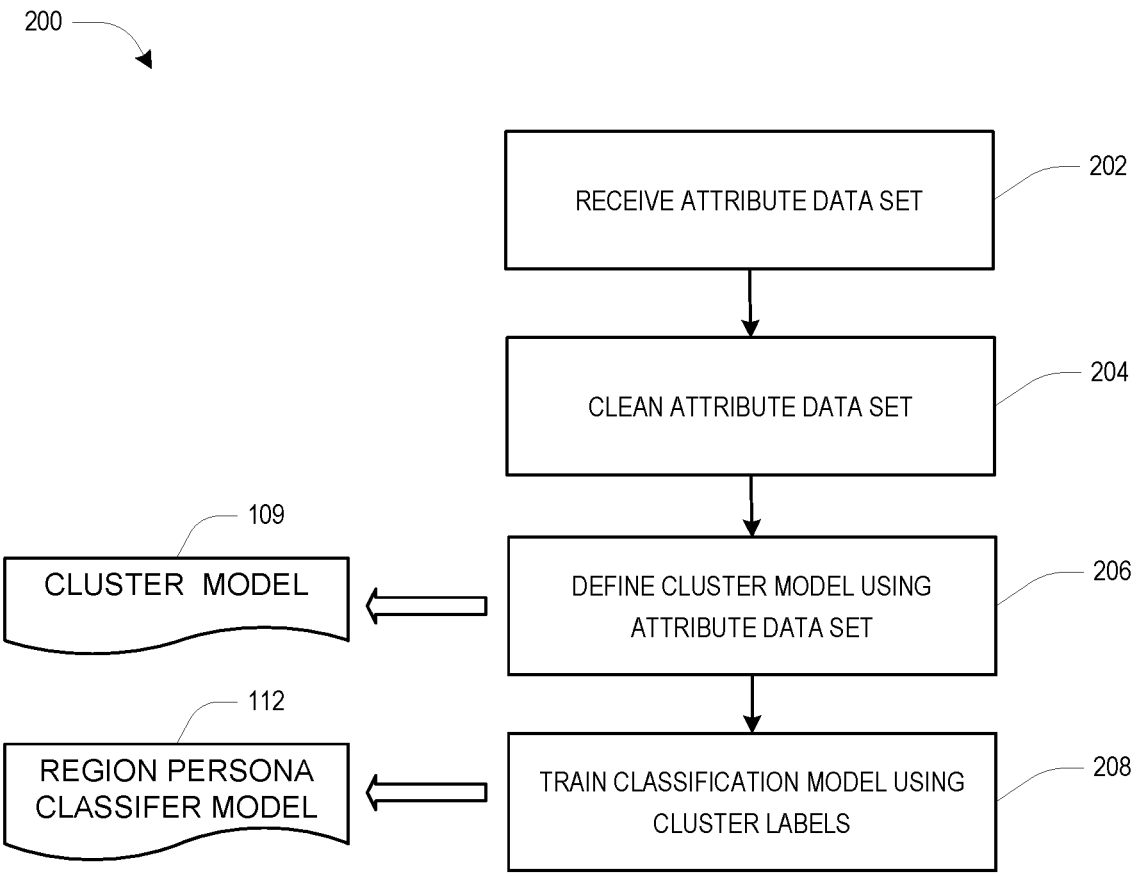
FIG. 2 is a flow chart illustrating an example method for training region persona generation models.
Figure 3:
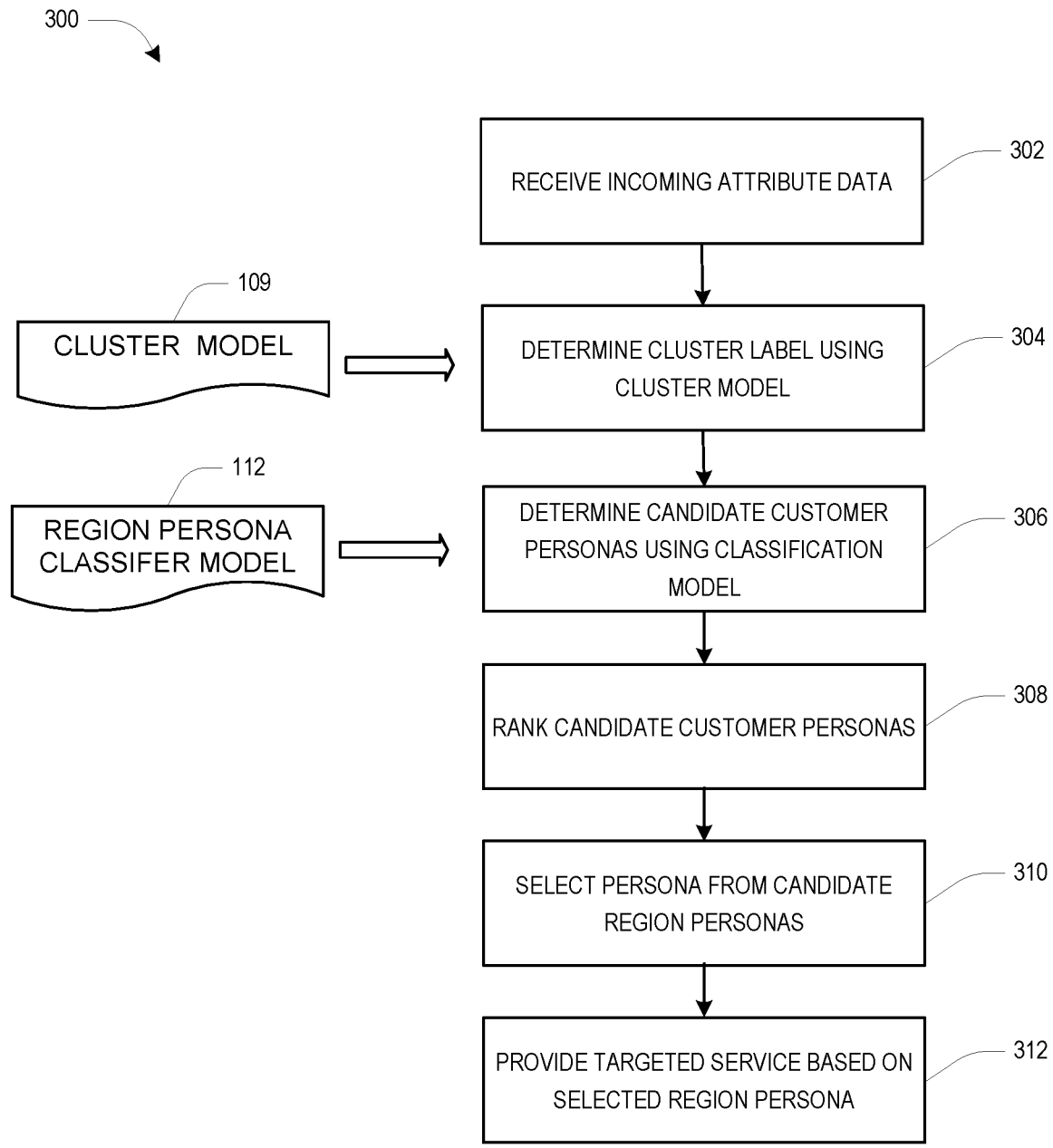
FIG. 3 is a flow chart illustrating an example method for content targeting using a region persona.

FIG. 1 is a diagram illustrating an example system 101 for region persona generation. FIG. 2 is a flow chart illustrating an example method for training region persona generation models. FIG. 3 is a flow chart illustrating an example method for service parameter targeting using a region persona. In some embodiments, the example methods 200, 300 are implemented by the example system 101.

Referring to FIG. 1, a database 102 stores information for region persona generation and content targeting. In some embodiments, the database 102 stores attribute data 104 and content 106. In some embodiments, the attribute data 104 includes information about regions, such as numerical or categorical data. Example numeric data includes cell site ID, antenna count, structure height, backhaul capacity, location, frequency, population density, road coverage density, average user count, sector count, or other suitable numerical attribute data. Example categorical attribute data includes cell site type, terrain type, technology supported type, or other suitable categorical attributes. A persona generator 108 uses the attribute data 104 and a cluster model 109 to generate a cluster label 110. In some embodiments, the cluster model 109 comprises a k-means model that defines clusters of attributes. For example, given a set of observations, where each observation includes d attributes, the cluster model 109 partitions the observations into k clusters. For example, the observations are region records, and the attributes are region attributes. In some embodiments, using a k-means approach, the clusters are selected to minimize the variation between the attributes and the attribute means within each cluster. Each cluster has a label. In some embodiments, the persona generator 108 trains the cluster model 109 using a large set of region observations, each region observation including the attribute data 104 for a particular region. To use the cluster model 109 for an incoming region, the persona generator 108 provides the attribute data 104 for the incoming region as inputs to the cluster model 109 and the cluster model 109 outputs the cluster label 110.

In some embodiments, the persona generator 108 is implemented in a device 120, such as such as a computing device, a portable media player (e.g., an electronic text reader, an audio device, a portable gaming device, an exercise device, or a navigation device); a portable communication device (e.g., a camera, a phone, a wearable or a text chatting device); a workstation; a server; a cloud computing device; and/or a laptop form factor computer.

The persona generator 108 uses the cluster label 110 as an input to a region persona classifier model 112 to generate a region persona 114 for the incoming customer. In some embodiments, the region persona classifier model 112 comprises a decision tree classifier model. The region persona classifier model 112 employs a tree structure with decision nodes and leaf nodes. A decision node has two or more branches differentiated by a value of an attribute, such as a height range, a terrain type, a technology supported type, etc. A leaf node defines a composite set of attributes. The region persona 114 represents a path through the tree structure in the region persona classifier model 112 and includes the attributes on the path from the root node to the leaf node. Not all attributes may be represented in a particular leaf node. In some embodiments, the cluster labels 110 generated for the cluster model 109 during training are used as training labels for the large set of customer observations to train the region persona classifier model 112.

An example segmentation rule for a leaf node is:
Cell_Site_MACRO>=1.0 and
antenna_count<=2 and
height>30 and
Loc_lat>30 and
frequency>600 and
population density>=10 and
sector count==3.

The resulting region persona 114 associated with the leaf node is:
"Cell_Site_MACRO is True and antenna_count is in range [1, 2] and height is in range [0, 30] and Loc_lat is in range [28, 30] and LOC_long is in range [−39, −40] and Frequency is in range [600, and 40] and population density is in range [10, 500] and sector_count is 3"

The region persona 114 comprises ranges of values for a subset of the attributes in the attribute data 104.

Since each leaf node does not necessarily define segments for each attribute, the incoming customer may match the segment rule for multiple leaf nodes, and may thus have multiple candidate region personas 114 based on the attribute data 104. In some embodiments, the persona generator 108 ranks candidate region personas 114 based on a scoring function:

Persona_Score=Size_Weight*(Persona_Size$^i$_/Total_instance_count)+Diversity_Weight*(Persona_feature_count$^i$_/Total_feature_count), Size weight=weight based on the number of instances covered by the persona (number of observations from large data set).
Diversity Weight=weight based on diversity of attributes in the persona (number of attributes).
Persona size=total number of instances covered by the persona.
Total_Instance_count=total number of instances in the data.
Total_feature_count=total number of attributes in the data.
Persona_feature_count=number of attributes included in the persona.

In some embodiments, the persona generator 108 selects a region persona 114 having the highest score for the incoming region. Based on the identified region persona 114 the persona generator generates recommended service parameters 116 for providing service to customers in the incoming region. In some embodiments, the recommended service parameters may include bandwidth, power supply, percentage of activated antennas, antenna sector (angle of coverage area), frequency, or some other suitable service parameter. For example, for a region including an event venue (e.g., stadium, concert hall, theater, etc.), the recommended service parameters 116 may relate to technology—enabling 4G versus 5G or modifying the allowed bandwidth of the customers in the region.

In some embodiments, the persona generator parses the content 106 to generate targeted content 117 includes content that was utilized by previous customers in regions having the same region persona 114. For example, where the targeted content 117 comprises targeted information, information consumed by other customers or service plan options may be prioritized for presentation to the current customer.

FIG. 2 is a flow chart illustrating an example method 200 for training persona generation models, such as the cluster model 109 and the region persona classifier model 112. At 202, the persona generator 108 receives an attribute data set. For example, the attribute data set may comprise the attribute data 104 for a large set of regions. At 204, the persona generator 108 cleans the attribute data set. In some embodiments, the persona generator 108 cleans the attribute data set using format rules to provide consistent attribute values across the records. At 206, the persona generator 108 defines the cluster model 109 using the attribute data set by identifying clusters of attributes and assigning labels to each cluster. At 208, the persona generator 108 generates the region persona classifier model 112 using the cluster labels. In some embodiments, the persona generator 108 generates a decision tree with branches based on the attribute values and leaf nodes that segment the attributes to define the region personas 114.

FIG. 3 is a flow chart illustrating an example method 300 for content targeting using a persona. At 302, the persona generator 108 receives incoming attribute data 104, such as the attributes of a region for which service parameters are to be evaluated. At 304, the persona generator 108 determines a cluster label 110 for the region using the cluster model 109. At 306, the persona generator 108 determines candidate region personas 114 using the region persona classifier model 112. At 308, the persona generator 108 ranks the candidate region personas 114, for example, based on a scoring function that considers the size and diversity of the candidate region personas 114. At 310, the persona generator 108 selects one of the candidate region personas 114, for example, the candidate region persona 114 having the highest score. In some embodiments, the persona generator 108 selects multiple candidate region personas 114. At 312, the candidate region persona 114 provides recommended service parameters 116 based on the selected region persona(s) 114. The persona generator 108 may select content 106 from the database 102 that has been employed successfully by previous customers in a region with the same region persona 114 to generate the targeted content 117. If multiple region personas 114 are employed, the targeted content 117 may be sorted such that the targeted content 117 associated with the region persona 114 with the highest score is provided first. In some embodiments, the region personas 114 are linked to the content 106 based on customer behavioral patterns and web interaction data.

Figure 4:
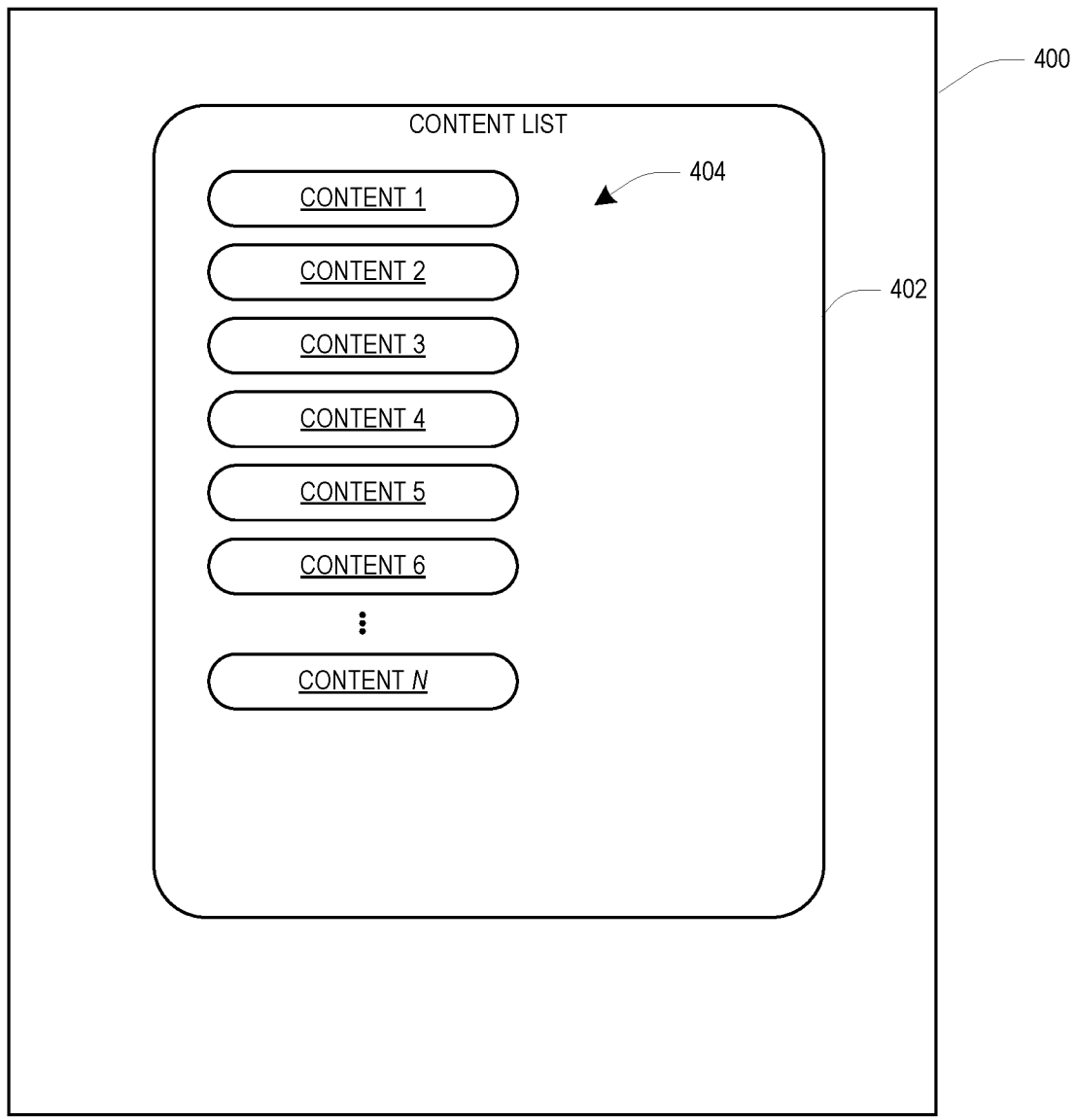
FIG. 4 is a diagram illustrating an example interface for displaying targeted content.

FIG. 4 is a diagram illustrating an example interface 400 for providing the targeted content 117. In some embodiments, the interface 400 comprises a display of a computing device, a smartphone, a tablet, a smartwatch, an augmented reality display, or some other suitable display device. A content list 402 is provided on the interface 400. In some embodiments, the content list 402 includes a set of targeted content items 404 generated based on the selected region persona 114 or region personas 114. The content list 402 may be ranked, such as by persona score or relevance based on previous customer interactions. In some embodiments, the interface 400 allows the user to select a targeted content item 404 to retrieve the associated content. In some embodiments, the content list 402 only includes the highest ranked targeted content items 404.

In some embodiments, the region persona 114 is a compressed representation of the attribute data 104 for a region. Using the region persona 114 to generate the targeted content improves the operation of the computing system implementing the persona generator 108 since it reduces computational complexity. The compressed information represented by the region persona 114 is used to provide the recommended service parameters 116 and/or targeted content 117 rather than relying on processing the full attribute data 104 for the region, thereby allowing the content personalization to be executed more quickly with less computing resource expenditure. Another advantage of the region persona 114 is that the compressed information is still in human readable form, allowing model validation and fostering bias identification and mitigation in the content recommendation.

In some embodiments, the region persona 114 provides segmented patterns ranked by persona score that can be used to provide opportunities/insights to take business action. Multiple homogeneous region personas 114 are created from huge volumes of data in a shorter time compared to manual methods.

Figure 5:
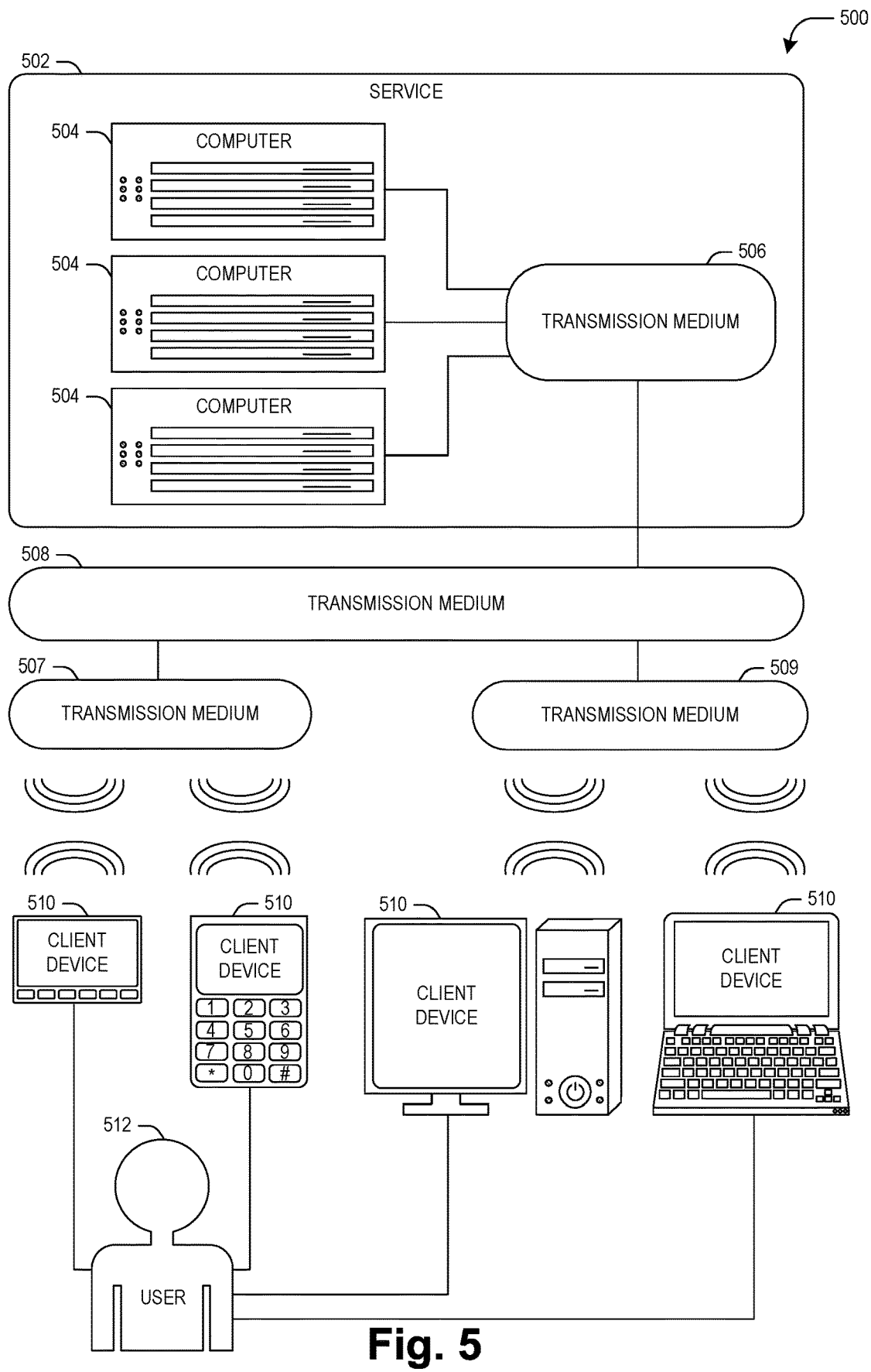
FIG. 5 is an illustration of a scenario involving various examples of transmission mediums that may be used to communicatively couple computers and clients.

FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figure 6:
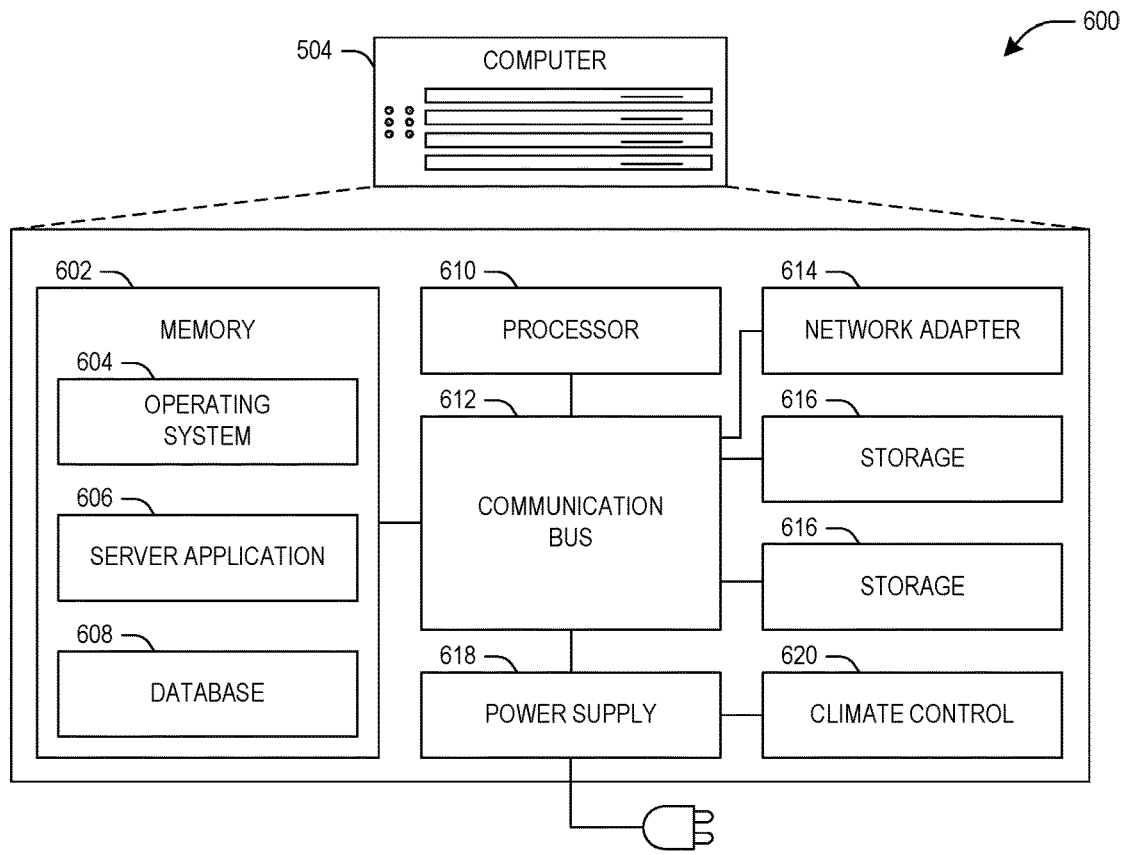
FIG. 6 is an illustration of a scenario involving an example configuration of a computer that may utilize and/or implement at least a portion of the techniques presented herein.

FIG. 6 presents a schematic architecture diagram 600 of a computer 504 that may utilize at least a portion of the techniques provided herein. Such a computer 504 may vary widely in configuration or capabilities, alone or in conjunction with other computers, in order to provide a service such as the service 502.

The computer 504 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 504 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 504 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 504 with at least one other computer. Other components that may optionally be included with the computer 504 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 504 to a state of readiness.

The computer 504 may operate in various physical enclosures, such as a desktop or tower, and/or may be integrated with a display as an "all-in-one" device. The computer 504 may be mounted horizontally and/or in a cabinet or rack, and/or may simply comprise an interconnected set of components. The computer 504 may comprise a dedicated and/or shared power supply 618 that supplies and/or regulates power for the other components. The computer 504 may provide power to and/or receive power from another computer and/or other devices. The computer 504 may comprise a shared and/or dedicated climate control unit 620 that regulates climate properties, such as temperature, humidity, and/or airflow. Many such computers 604 may be configured and/or adapted to utilize at least a portion of the techniques presented herein.

Figure 7:
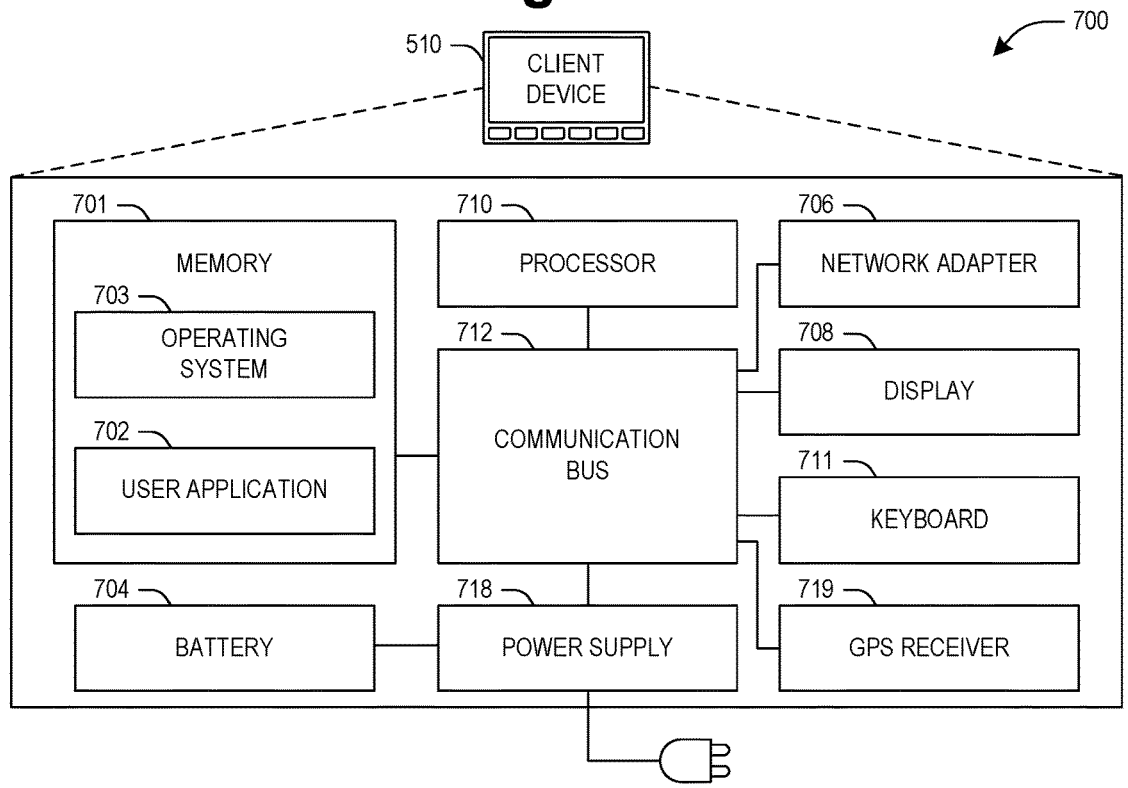
FIG. 7 is an illustration of a scenario involving an example configuration of a client that may utilize and/or implement at least a portion of the techniques presented herein.

FIG. 7 presents a schematic architecture diagram 700 of a client device 510 whereupon at least a portion of the techniques presented herein may be implemented. Such a client device 510 may vary widely in configuration or capabilities, in order to provide a variety of functionality to a user such as the user 512. The client device 510 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 510 may serve the user in a variety of roles, such as a workstation, kiosk, media player, gaming device, and/or appliance.

The client device 510 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The client device 510 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 510 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 510, a compass, accelerometer, and/or gyroscope that detects a physical orientation of the client device 510. Other components that may optionally be included with the client device 510 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 510 to a state of readiness; and a climate control unit that regulates climate properties, such as temperature, humidity, and airflow.

The client device 510 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 510 may comprise a dedicated and/or shared power supply 718 that supplies and/or regulates power for other components, and/or a battery 704 that stores power for use while the client device 510 is not connected to a power source via the power supply 718. The client device 510 may provide power to and/or receive power from other client devices.

Figure 8:
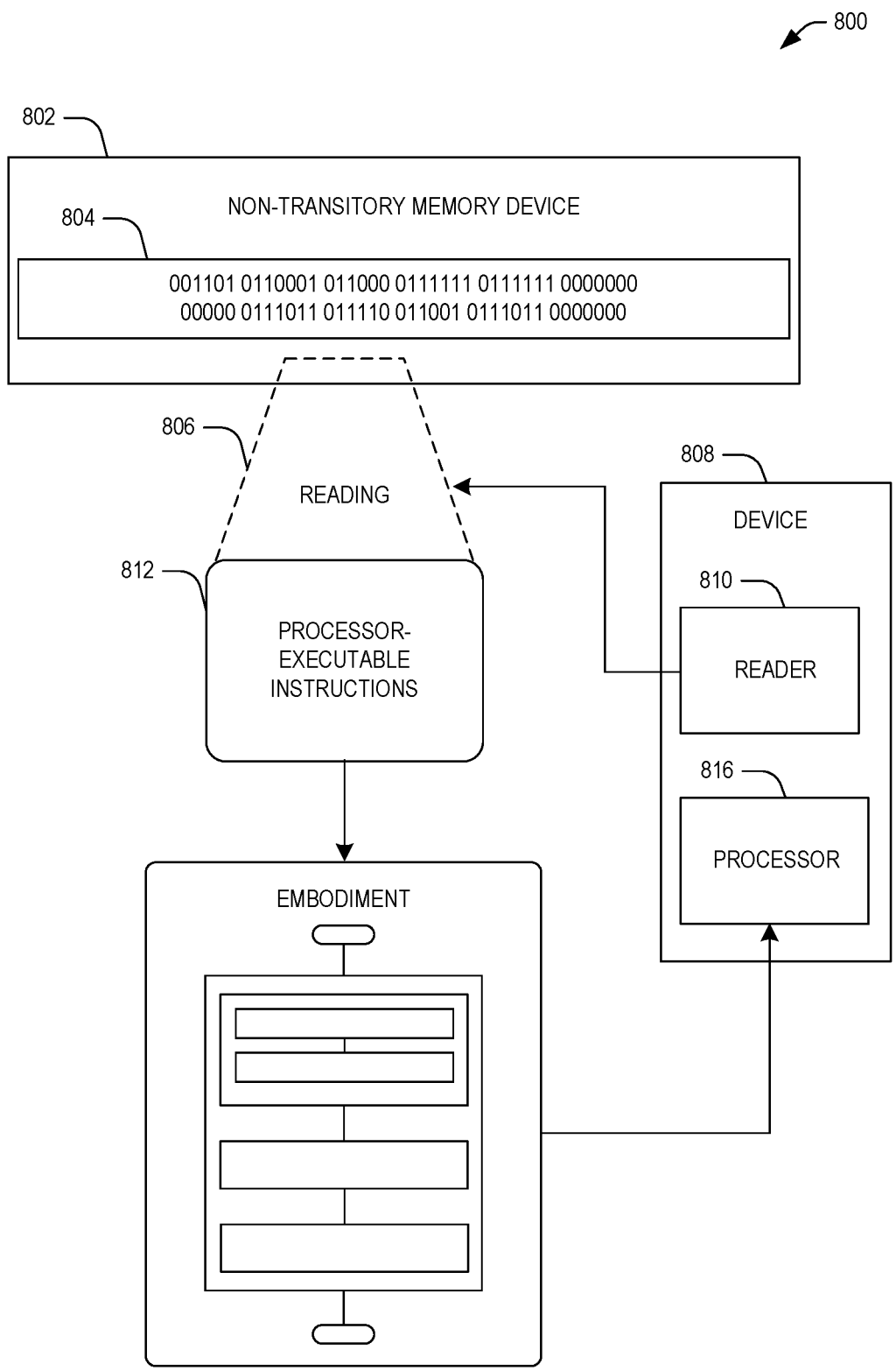
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, for example. In some embodiments, the processor-executable instructions 812 are configured to cause implementation of a system, such as at least some of the example system 101 of FIG. 1, for example.

Figure 9:
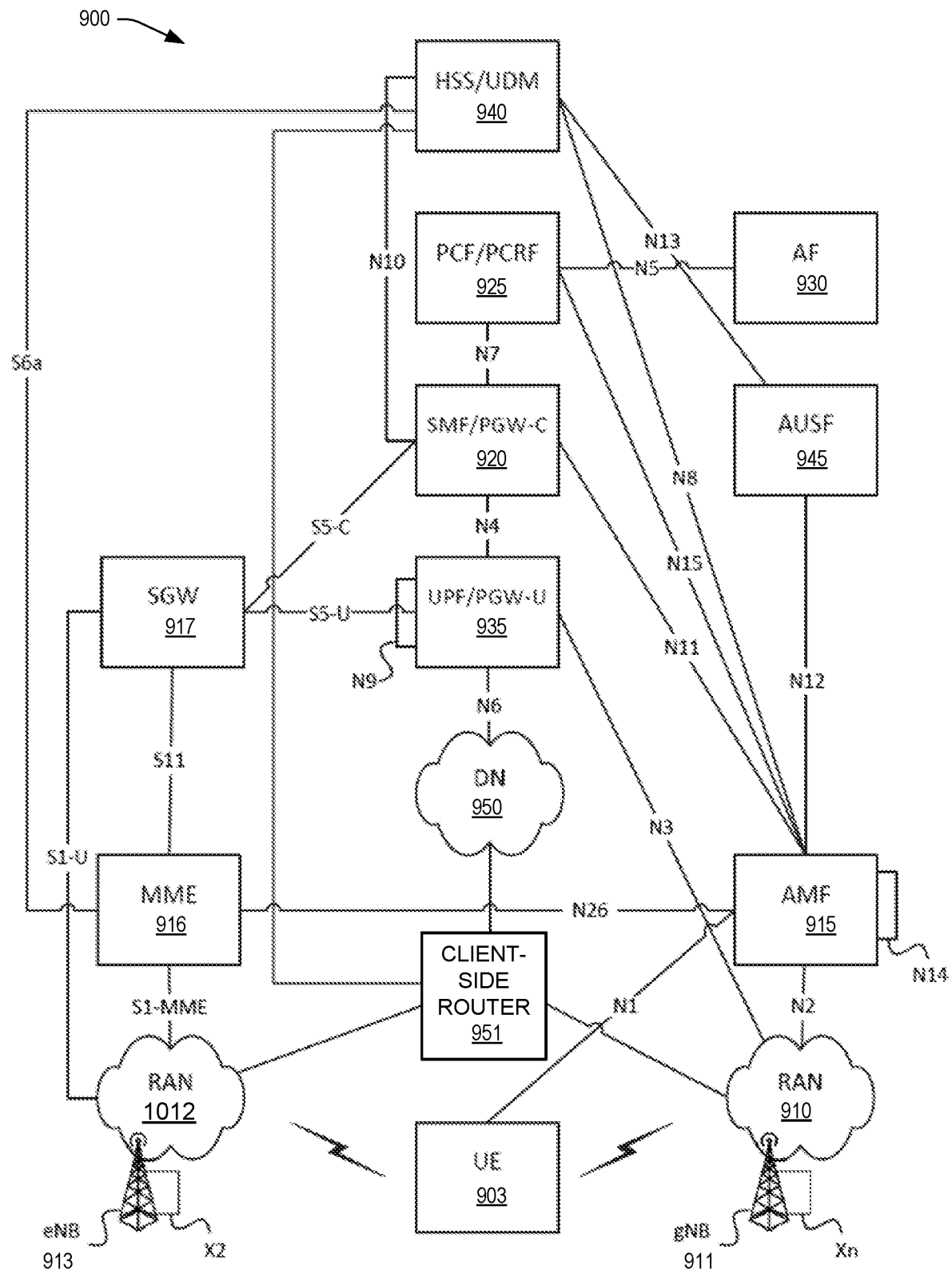
FIG. 9 is an illustration of an example environment in which at least a portion of the techniques presented herein may be utilized and/or implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 903, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as client-side router 951.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/

PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively and/or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 903 may include a computation and communication device, such as a wireless mobile communication device that is capable of communicating with RAN 910, RAN 912, and/or DN 950. UE 903 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 903 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 903 may communicate with one or more other elements of environment 900. UE 903 may communicate with RAN 910 via an air interface (e.g., as provided by gNB 911). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, AMF 915, and/or one or more other devices or networks) and may communicate the traffic to UE 903 via the air interface.

RAN 912 may be, or may include, a LTE RAN that includes one or more base stations (e.g., one or more eNBs 913), via which UE 903 may communicate with one or more other elements of environment 900. UE 903 may communicate with RAN 912 via an air interface (e.g., as provided by eNB 913). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, SGW 917, and/or one or more other devices or networks) and may communicate the traffic to UE 903 via the air interface.

AMF 915 may include one or more devices, systems, Virtualized Network Functions ("VNFs"), etc., that perform operations to register UE 903 with the 5G network, to establish bearer channels associated with a session with UE 903, to hand off UE 903 from the 5G network to another network, to hand off UE 903 from the other network to the 5G network, manage mobility of UE 903 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 903 with the EPC, to establish bearer channels associated with a session with UE 903, to hand off UE 903 from the EPC to another network, to hand off UE 903 from another network to the EPC, manage mobility of UE 903 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 903. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 903, from DN 950, and may forward the user plane data toward UE 903 (e.g., via RAN 910, SMF/PGW-C 920, and/or one or more other devices). In some embodiments, multiple UPFs 935 may be deployed (e.g., in different geographical locations), and the delivery of content to UE 903 may be coordinated via the N9 interface (e.g., as denoted in FIG. 9 by the line marked "N9" originating and terminating at UPF/PGW-U 935). Similarly, UPF/PGW-U 935 may receive traffic from UE 903 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 903.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 903 may communicate, through DN 950, with data servers, other UEs UE 903, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 903 may communicate.

The client-side router 951 may include one or more devices, systems, VNFs, etc., that perform one or more operations described herein. For example, the client-side router 951 may monitor and/or analyze video stream chunks and/or statuses associated with video stream chunks to check for quality issues and/or may deliver video stream chunks to UE 903.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1000. In some embodiments, a particular RAN may include multiple DU networks 1000. In some embodiments, DU network 1000 may correspond to a particular gNB 1011 of a 5G RAN (e.g., RAN 1010). In some embodiments, DU network 1000 may correspond to multiple gNBs 1011. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

Figure 10:
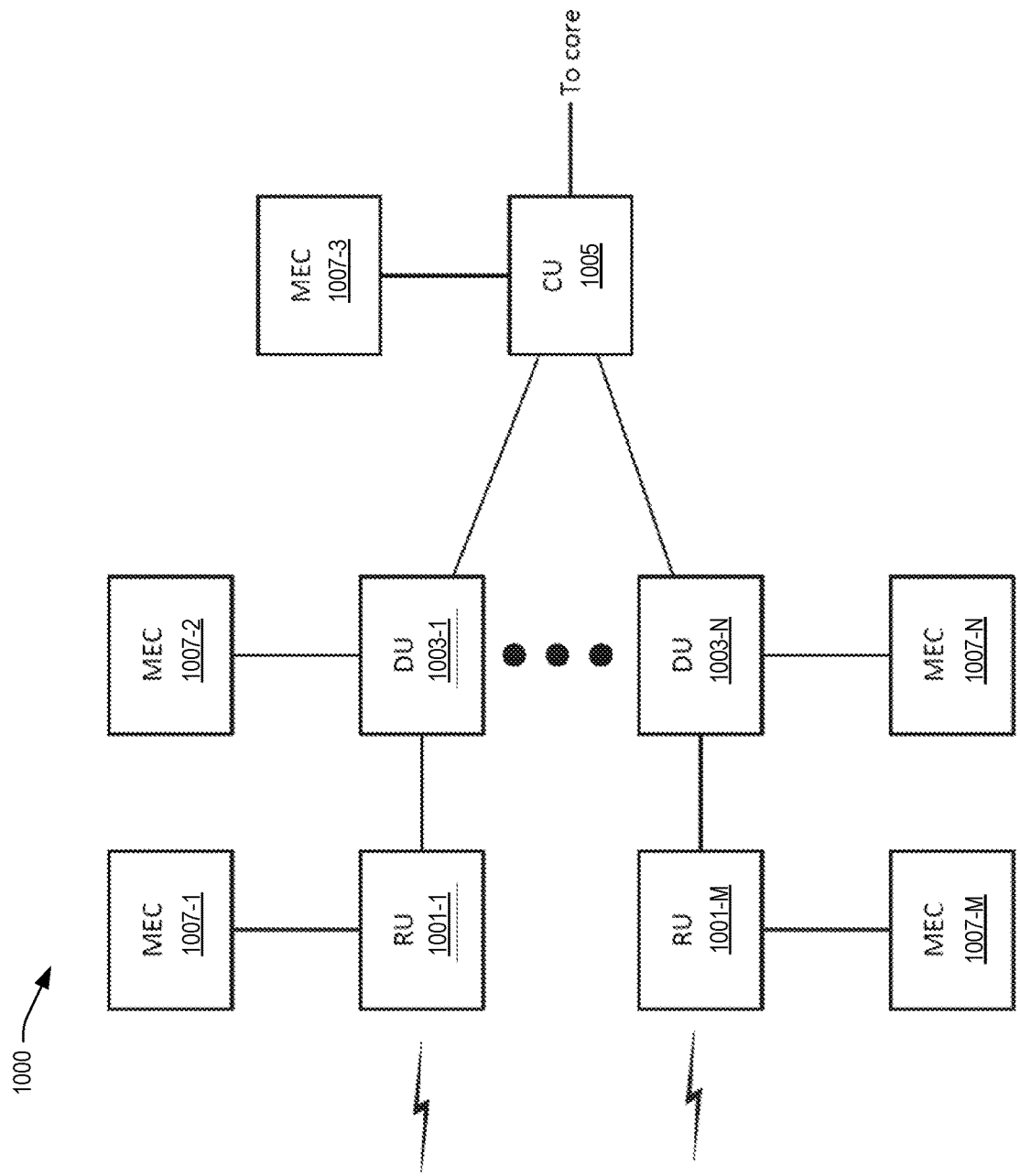
FIG. 10 is an illustration of an example network that may utilize and/or implement at least a portion of the techniques presented herein.

CU 1005 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 903 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 903, and may determine which DU(s) 1003 should receive the downlink traffic. DU 1003 may include one or more devices that transmit traffic between a core network (e.g., via CU 1005) and UE 903 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 903.

RU 1001 may include hardware circuitry (e.g., one or more RF transceivers, antennas, radios, and/or other suitable hardware) to communicate wirelessly (e.g., via an RF interface) with one or more UEs 903, one or more other DUs 1003 (e.g., via RUs 1001 associated with DUs 1003), and/or any other suitable type of device. In the uplink direction, RU 1001 may receive traffic from UE 903 and/or another DU 1003 via the RF interface and may provide the traffic to DU 1003. In the downlink direction, RU 1001 may receive traffic from DU 1003, and may provide the traffic to UE 903 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 903, via a respective RU 1001.

For example, RU 1001-1 may route some traffic, from UE 903, to MEC 1007-1 instead of to a core network (e.g., via DU 1003 and CU 1005). MEC 1007-1 may process the traffic, perform one or more computations based on the received traffic, and may provide traffic to UE 903 via RU 1001-1. In this manner, ultra-low latency services may be provided to UE 903, as traffic does not need to traverse DU 1003, CU 1005, and an intervening backhaul network between DU network 1000 and the core network. In some embodiments, MEC 1007 may include, and/or may implement some or all of the functionality described above with respect to the client-side router 1051 and/or at least one cache node of the cache.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
receiving, by a device, attribute data for a first region served by a telecommunications service;
determining, by the device, a cluster label for the first region based on the attribute data;
determining, by the device, a first region persona for the first region using a decision tree classifier model based on the cluster label;
receiving second attribute data, different than the attribute data, for a second region served by the telecommunications service;
determining a second cluster label, different than the cluster label, for the second region based on the second attribute data;
determining a second region persona, different than the first region persona, for the second region based on the second cluster label; and
implementing, by the device, a corresponding set of recommended service parameters for the telecommunications service in each region of a plurality of regions served by the telecommunications service by using the set of recommended service parameters to configure one or more devices in the region based on a region persona of the region, wherein the implementing comprises using first recommended service parameters to configure one or more first devices in the first region based on the first region persona and using second recommended service parameters, different than the first recommended service parameters, to configure one or more second devices in the second region based on the second region persona.

2. The method of claim 1, wherein:
the first region persona represents a path through a tree structure in the decision tree classifier model and includes attributes on the path from a root node to a leaf node.

3. The method of claim 1, wherein:
the attribute data comprises at least one of cell site ID, antenna count, structure height, backhaul capacity, location, frequency, population density, road coverage density, average user count, sector count, cell site type, terrain type or technology supported type.

4. The method of claim 1, wherein:
the first recommended service parameters comprise at least one of a bandwidth, a priority, a network type, a power supply, a percentage of activated antennas, an antenna sector or a frequency; and
the second recommended service parameters comprise at least one of a second bandwidth, a second priority, a second network type, a second power supply, a second percentage of activated antennas, a second antenna sector or a second frequency.

5. The method of claim 1, comprising:
providing, by the device, targeted content for users in the first region based on the first region persona.

6. The method of claim 1, wherein:
determining, by the device, the first region persona comprises identifying, by the device, a first candidate region persona and a second candidate region persona;
determining, by the device, a first score for the first candidate region persona and a second score for the second candidate region persona; and selecting, by the device, the first candidate region persona as the first region persona responsive to the first score being greater than the second score.

7. The method of claim 6, wherein:
determining, by the device, the first score comprises determining the first score based on a diversity parameter associated with the first candidate region persona.

8. The method of claim 6, wherein:
determining, by the device, the first score comprises determining the first score based on a size parameter associated with the first candidate region persona.

9. The method of claim 6, comprising:
selecting, by the device, a third region persona from the first candidate region persona and the second candidate region persona;
providing, by the device, targeted content for users in the first region based on the first region persona and the third region persona; and
sorting, by the device, the targeted content based on the first score and the second score such that a portion of the targeted content associated with the first region persona is provided prior to a second portion of the targeted content associated with the third region persona responsive to the first score being greater than the second score.

10. A system comprising:
a processor configured to execute instructions to facilitate performance of operations comprising:
receiving attribute data for a first region served by a telecommunications service;
determining a cluster label for the first region based on the attribute data;
determining a first region persona for the first region using a decision tree classifier model based on the cluster label;
receiving second attribute data, different than the attribute data, for a second region served by the telecommunications service;
determining a second cluster label, different than the cluster label, for the second region based on the second attribute data;
determining a second region persona, different than the first region persona, for the second region based on the second cluster label; and
implementing a corresponding set of recommended service parameters for the telecommunications service in each region of a plurality of regions served by the telecommunications service by using the set of recommended service parameters to configure one or more devices in the region based on a region persona of the region, wherein the implementing comprises using first recommended service parameters to configure one or more first devices in the first region based on the first region persona and using second recommended service parameters, different than the first recommended service parameters, to configure one or more second devices in the second region based on the second region persona.

11. The system of claim 10, wherein:
the first region persona comprises a first range of values for a first attribute of the attribute data and a second range of values for a second attribute of the attribute data.

12. The system of claim 10, wherein:
the operations comprise determining the cluster label using a cluster model.

13. The system of claim 12, wherein:
the operations comprise determining the cluster label using a k-means cluster model.

14. The system of claim 10, wherein:
the operations comprise providing targeted content for users in the first region based on the first region persona.

15. The system of claim 10, wherein:
the operations comprise:
determining the first region persona by identifying a first candidate region persona and a second candidate region persona;
determining a first score for the first candidate region persona and a second score for the second candidate region persona; and
selecting the first candidate region persona as the first region persona responsive to the first score being greater than the second score.

16. The system of claim 15, wherein:
the operations comprise determining the first score based on a diversity parameter associated with the first candidate region persona.

17. The system of claim 15 wherein:
the operations comprise determining the first score based on a size parameter associated with the first candidate region persona.

18. The system of claim 15, wherein the operations comprise:
selecting a third region persona from the first candidate region persona and the second candidate region persona;
providing targeted content for users in the first region based on the first region persona and the third region persona; and
sorting the targeted content based on the first score of the first region persona and the second score of the third region persona such that a portion of the targeted content associated with the first region persona is provided prior to a second portion of the targeted content associated with the third region persona responsive to the first score being greater than the second score.

19. A non-transitory computer-readable medium storing instructions that when executed facilitate performance of operations comprising:
receiving attribute data for a first region served by a telecommunications service;
determining a cluster label for the first region based on the attribute data;
determining a first region persona for the first region using a decision tree classifier model based on the cluster label;
receiving second attribute data, different than the attribute data, for a second region served by the telecommunications service;
determining a second cluster label, different than the cluster label, for the second region based on the second attribute data;
determining a second region persona, different than the first region persona, for the second region based on the second cluster label; and
implementing a corresponding set of recommended service parameters for the telecommunications service in each region of a plurality of regions served by the telecommunications service by using the set of recommended service parameters to configure one or more devices in the region based on a region persona of the region, wherein the implementing comprises using first recommended service parameters to configure one or more first devices in the first region based on the first region persona and using second recommended service parameters, different than the first recommended service parameters, to configure one or more second devices in the second region based on the second region persona.

20. The non-transitory computer-readable medium of claim 19, wherein the operations comprise:
    determining the first region persona by identifying a first candidate region persona and a second candidate region persona;
    determining a first score for the first candidate region persona and a second score for the second candidate region persona; and
    selecting the first candidate region persona as the first region persona responsive to the first score being greater than the second score.

\* \* \* \* \*